United States Patent
Ackermann

(12) 
(10) Patent No.: US 6,210,772 B1
(45) Date of Patent: Apr. 3, 2001

(54) PROTECTOR FOR A FRONT FENDER OF A VEHICLE

(76) Inventor: Frank Ackermann, 222 Warren Ave., Hawthorn, NY (US) 10532

( * ) Notice: Subject to any disclaimer, the term of this patent is extended or adjusted under 35 U.S.C. 154(b) by 0 days.

(21) Appl. No.: 09/285,961

(22) Filed: Apr. 5, 1999

(51) Int. Cl.$^7$ ................................. B32B 3/04; B32B 3/06
(52) U.S. Cl. ........................ 428/100; 428/99; 428/102; 428/124; 280/770; 150/166
(58) Field of Search ................. 428/99, 100, 124, 428/102; 150/166; 280/770

(56) References Cited

U.S. PATENT DOCUMENTS

| | | | |
|---|---|---|---|
| 3,298,712 | * 1/1967 | Greenstadt | 280/770 |
| 3,924,212 | 12/1975 | Brown | 335/303 |
| 4,849,272 | 7/1989 | Haney et al. | 428/102 |
| 4,884,824 | * 12/1989 | Radke | 150/166 |
| 4,895,753 | 1/1990 | Etter | 428/286 |
| 5,290,618 | 3/1994 | Olson et al. | 428/100 |
| 5,945,194 | * 8/1999 | Pester | 428/100 |

\* cited by examiner

Primary Examiner—Alexander S. Thomas
(74) Attorney, Agent, or Firm—Richard L. Miller, P.E

(57) ABSTRACT

A protector for a front fender of a vehicle that includes a first layer of material for facing the front fender, a second layer of material attached to the first layer of material for facing away from the front fender, apparatus for maintaining the protector on the front fender, and an open topped transparent pocket disposed on the second layer of material for holding papers pertaining to the vehicle. The apparatus includes a pocket that is slender, elongated, and extends along the length of an upper terminal edge of the first layer of material for depending inwardly of the front fender of the vehicle. The pocket is divided into a long central portion, and a pair of short terminal portions that are shorter than and straddle the long central portion of the pocket. The long central portion is filled with sand for weight in maintaining the protector on the front fender, while the pair of short terminal portions are empty of the sand and lie flat for not catching on the hood hinges of the vehicle.

11 Claims, 1 Drawing Sheet

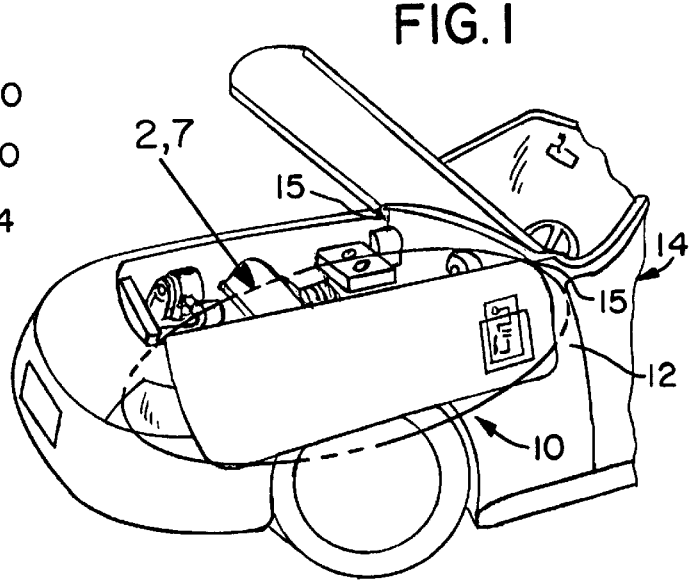
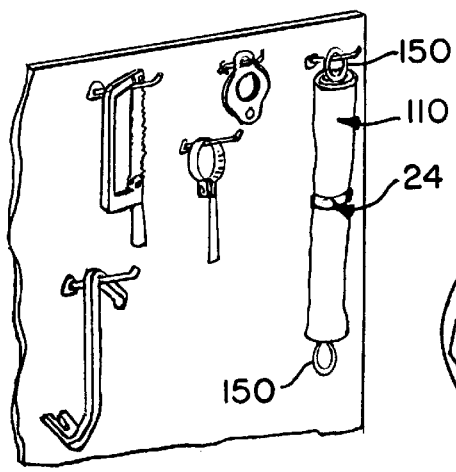
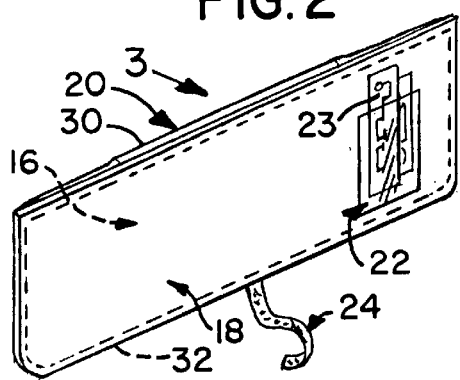
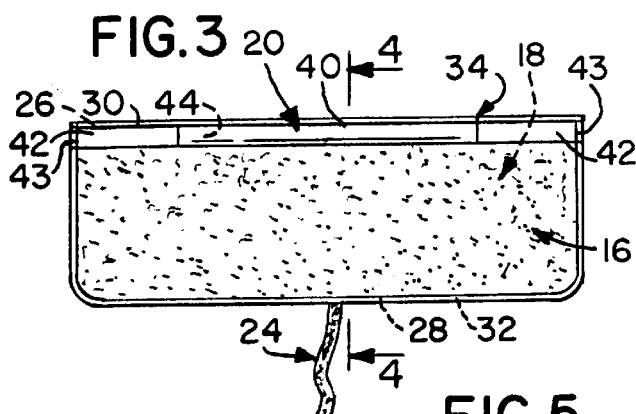
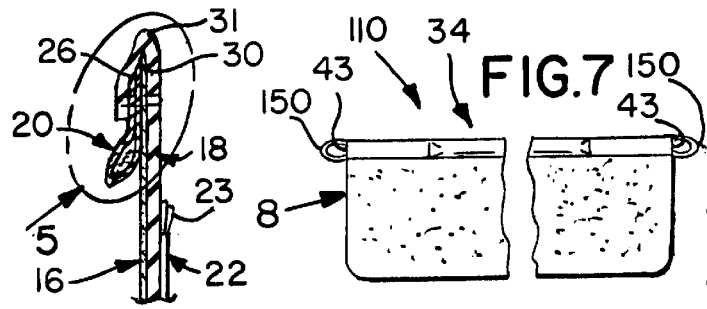
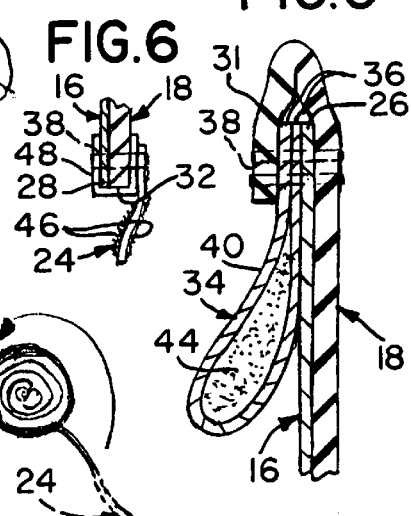
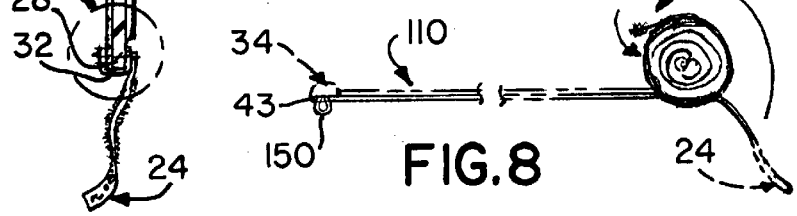

PROTECTOR FOR A FRONT FENDER OF A VEHICLE

BACKGROUND OF THE INVENTION

1. Field of the Invention

The present invention relates to a protector. More particularly, the present invention relates to a protector for a front fender of a vehicle.

2. Description of the Prior Art

Numerous innovations for fender protectors have been provided in the prior art that will be described. Even though these innovations may be suitable for the specific individual purposes to which they address, however, they differ from the present invention.

A first example, U.S. Pat. No. 3,924,212 to Brown teaches a fender protector of the type used by automobile mechanics composed of a vinyl cloth-backed fabric on which is affixed by contact cement flexible magnetic strips alternated from one side to the other to render the cloth nonslippable along the fender and provide the mechanic ribbed and magnetically responsive areas where he can temporarily place and secure tools and parts. The magnetic strips are preferably spaced at equal distance apart and parallel. However, there may be more magnetic strips in one side of the cloth than the other and may be concentrated in a specific area of nearer to one edge of the cloth of the protector.

A second example, U.S. Pat. No. 4,849,272 to Haney et al. teaches A fender cover that includes a relatively soft, non-abrasive first layer which is disposed against a fender and an outer cover which is substantially impermeable to grease and other contaminants for protecting a fender while a mechanic works on an engine. The fender cover is held in place on the fender by means of flexible magnetic elements disposed between the two layers.

A third example, U.S. Pat. No. 4,895,753 to Etter teaches a flexible fender cover adapted for covering a fender of an automobile or the like while a mechanic works on the automobile. The cover comprises an absorbent layer of a generally oleophilic melt blown microfiber material, and a non-slip layer on one major surface of the absorbent layer. The absorbent layer is bonded at spaced locations to prevent separation or linting of the fibers forming the layer. The non-slip layer is formed of generally non-slip and non-abrasive elastomeric material having a generally high coefficient of friction in a shear mode relative to the fender to grip the fend, with generally low adhesion when peeled or lifted from the fender.

A fourth example, U.S. Pat. No. 5,290,618 to Olson et al. teaches a single layer protective cover of a flexible synthetic leather-like material resistant to automotive chemicals and having a smooth cushioning non-slipping non-scratching inward or under surface of a length and width to cover an automotive fender adequately for its protection against scratches while a technician is working under the raised hood of the automobile and flexible means having terminal hooks to secure said cover.

It is apparent that numerous innovations for fender protectors have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

Accordingly, an object of the present invention is to provide a protector for a front fender of a vehicle that avoids the disadvantages of the prior art.

Another object of the present invention is to provide a protector for a front fender of a vehicle that is simple and inexpensive to manufacture.

Still another object of the present invention is to provide a protector for a front fender of a vehicle that is simple to use.

Briefly stated, yet another object of the present invention is to provide a protector for a front fender of a vehicle that includes a first layer of material for facing the front fender, a second layer of material attached to the first layer of material for facing away from the front fender, apparatus for maintaining the protector on the front fender, and an open topped transparent pocket disposed on the second layer of material for holding papers pertaining to the vehicle. The apparatus includes a pocket that is slender, elongated, and extends along the length of an upper terminal edge of the first layer of material for depending inwardly of the front fender of the vehicle. The pocket is divided into a long central portion, and a pair of short terminal portions that are shorter than and straddle the long central portion of the pocket. The long central portion is filled with sand for weight in maintaining the protector on the front fender, while the pair of short terminal portions are empty of the sand and lie flat for not catching on the hood hinges of lithe vehicle.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of a the present invention in use;

FIG. 2 is an enlarged diagrammatic perspective view of the area generally enclosed in the dotted curve identified by arrow 2 in FIG. 1 of a first embodiment of the present invention;

FIG. 3 is a diagrammatic rear elevational view taken generally in the direction of arrow 3 in FIG. 2;

FIG. 4 is an enlarged diagrammatic cross sectional view taken on line 4—4 in FIG. 3;

FIG. 5 is an enlarged diagrammatic cross sectional view of the area generally enclosed by the dotted curve identified by arrow 5 in FIG. 4;

FIG. 6 is an enlarged diagrammatic cross sectional view of the area generally enclosed by the dotted curve identified by arrow 6 in FIG. 4;

FIG. 7 is a diagrammatic rear elevational view of the area generally enclosed by the dotted curve identified by arrow 7 in FIG. 1 of a second embodiment of the present invention;

FIG. 8 is a diagrammatic side elevational view taken generally in the direction of arrow 8 in FIG. 7 of the present invention being rolled up; and FIG. 9 is a diagrammatic perspective view of the present invention rolled up as shown in FIG. 8 and stored on a wall.

LIST OF REFERENCE NUMERALS UTILIZED IN THE DRAWING

First Embodiment 10 protector for a front fender of a vehicle of the present invention 12 front fender of vehicle 14
14 vehicle
15 hood hinges of vehicle 14
16 first layer of material for facing front fender 12 of vehicle 14
18 second layer of material for facing away from front fender 12 of vehicle 14
20 apparatus for maintaining protector 10 on front fender 12 of vehicle 12
22 open topped transparent pocket for holding papers 23 pertaining to vehicle 14.
24 strap
26 upper terminal edge of first layer of material 16 for placement inward of front fender 12 of vehicle 14
28 lower terminal edge of first layer of material 16 for placement outward of front fender 12 of vehicle 14
30 upper terminal edge of second layer of material 18
31 wrapped upper terminal edge of upper terminal edge 30 of second layer of material 18
32 lower terminal edge of second layer of material 18
34 pocket of apparatus 20 for depending inwardly of front fender 12 of vehicle 14
36 aligned terminal edges of pocket 34 of apparatus 20
38 stitching
40 long central portion of pocket 34 of apparatus 20
42 pair of short terminal portions of pocket 34 of apparatus 20
43 respective terminal ends 43 a pair of short terminal portions 42 of pocket 34 of apparatus 20
44 sand for weight in maintaining protector 10 on front fender 12 of vehicle 14
46 strip of doubled sided mating portions of hook and loop fasteners of strap 24
48 channel webbing Second Embodiment 110 protector for a front fender of a vehicle of the present invention
150 pair of loops for hanging up protector 110 when rolled up and stored.

DETAILED DESCRIPTION OF THE PREFERRED EMBODIMENT

Referring now to the figures, in which like numerals indicate like parts, and particularly to FIG. 1, the protector for a front fender of a vehicle of the present invention is shown generally at 10 for a front fender 12 of a vehicle 14 that has hood hinges 15.

The overall configuration of the protector for a front fender of a vehicle 10 can best be seen in FIGS. 2–4, and as such, will be discussed with reference thereto.

The protector for a front fender of a vehicle 10 comprises a first layer of material 16 for facing the front fender 12 of the vehicle 14.

The protector for a front fender of a vehicle 10 further comprises a second layer of material 18 attached to the first layer of material 16 for facing away from the front fender 12 of the vehicle 14.

The protector for a front fender of a vehicle 10 further comprises apparatus 20 for maintaining the protector 10 on the front fender 12 of the vehicle 12.

The protector for a front fender of a vehicle 10 further comprises an open topped transparent pocket 22 disposed on the second layer of material 18 for holding papers 23 pertaining to the vehicle 14, such as work orders, schematics, or the like.

The protector for a front fender of a vehicle 10 further comprises a strap 24 depending from the protector 10 and holding the protector 10 rolled up.

The first layer of material 16 is relatively soft and non-abrasive, preferably foam, and has an upper terminal edge 26 with a length for placement inward of the front fender 12 of the vehicle 14, and a lower terminal edge 28 for placement outward of the front fender 12 of the vehicle 14.

The second layer of material 18 is substantially impermeable to grease and other contaminants, preferably vinyl, and overlies the first layer of material 16.

The second layer of material 18 has an upper terminal edge 30 that wraps over the upper terminal edge 26 of the first layer of material 16 so as to form a wrapped upper terminal edge 31, and a lower terminal edge 32 that aligns with the lower terminal edge 28 of the first layer of material 16.

The specific configuration of the apparatus 20 can best be seen in FIGS. 3 and 5, and as such, will be discussed with reference thereto.

The apparatus 20 comprises a pocket 34 that is formed by a separate piece of the first layer of material 16 that is folded upon itself to form aligned terminal edges 36.

The pocket 34 is disposed on and depends from the first layer of material 16, with the aligned terminal edges 36 thereof positioned against the upper terminal edge 26 of the first layer of material 16, between the upper terminal edge 26 of the first layer of material 16 and the wrapped upper terminal edge 31 of the second layer of material 18, and is maintained thereat, by stitching 38, that not only maintains the pocket 34 in position, but also holds the second layer of material 18 to the first layer of material 16 by extending therearound.

The pocket 34 is slender, elongated, and extends along the length of the upper terminal edge 26 of the first layer of material 16 for depending inwardly of the front fender 12 of the vehicle 14.

The pocket 34 is divided into a long central portion 40 and a pair of short terminal portions 42 that are shorter than and straddle the long central portion 40 of the pocket 34, and have respective terminal ends 43.

The long central portion 40 of the pocket 34 is filled with sand 44 for weight in maintaining the protector 10 on the front fender 12 of the vehicle 14.

The pair of short terminal portions 42 of the pocket 34 are empty of the sand 44 and lie flat for not catching on the hood hinges 15 of the vehicle 14.

The specific configuration of the strap 24 can best be seen in FIG. 6, and as such, will be discussed with reference thereto.

The strap 24 is a strip of doubled sided mating portions of hook and loop fasteners 46 that depends centrally from the protector 10, and is maintained thereat, by the stitching 38, that not only maintains the strap 24 depending from the protector 10, but also maintains channel webbing 48 around and maintaining together the first layer of material 16 and the second layer of material 18, with the strap 24 depending centrally from the channel webbing 48.

A second embodiment of the protector for a front fender of a vehicle 110 can best be seen in FIGS. 7–9, and as such, will be discussed with reference thereto.

The protector for a front fender of a vehicle 110 is identical to the protector for a front fender of a vehicle 10, as with the addition of a pair of loops 150 that extend aligningly outwardly from the respective terminal ends 43 of the pair of short portions 42 of the pocket 34 for hanging up the protector 110 when rolled up and stored, with the protector 110 being maintained rolled up by the strap 24.

It will be understood that each of the elements described above, or two or more together, may also find a useful application in other types of constructions differing from the types described above.

While the invention has been illustrated and described as embodied in a protector for a front fender of a vehicle, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A protector for a front fender of a vehicle that has hood hinges, comprising:
   a) a first layer of material for facing the front fender of the vehicle;
   b) a second layer of material attached to said first layer of material for facing away from the front fender of the vehicle; and
   c) apparatus for maintaining said protector on the front fender of the vehicle; further comprising a strap depending from said protector and holding said protector rolled up, wherein said first layer of material is relatively soft and non-abrasive, and has:
      i) an upper terminal edge with a length for placement inward of the front fender of the vehicle; and
      ii) a lower terminal edge for placement outward of the front fender of the vehicle, wherein said second layer of material has:
         A) an upper terminal edge that wraps over said upper terminal edge of said first layer of material so as to form a wrapped upper terminal edge; and
         B) a lower terminal edge that aligns with said lower terminal edge of said first layer of material, wherein said apparatus comprises a pocket that is formed by a separate piece of said first layer of material that is folded upon itself to form aligned terminal edges, wherein said pocket is divided into:
            aa) a long central portion; and
            bb) a pair of short terminal portions that are shorter than and straddle said long central portion of said pocket, and have respective terminal ends.

2. The protector as defined in claim 1; further comprising an open topped transparent pocket disposed on said second layer of material for holding papers pertaining to the vehicle.

3. The protector as defined in claim 1, wherein said first layer of material is foam.

4. The protector as defined in claim 1, wherein said second layer of material is substantially impermeable to grease, and overlies said first layer of material.

5. The protector as defined in claim 1, wherein said second layer of material is vinyl.

6. The protector as defined in claim 1, wherein said pocket is disposed on and depends from said first layer of material, with said aligned terminal edges thereof positioned against said upper terminal edge of said first layer of material, between said upper terminal edge of said first layer of material and said wrapped upper terminal edge of said second layer of material, and is maintained thereat, by stitching, that not only maintains said pocket in position, but also holds said second layer of material to said first layer of material by extending therearound.

7. The protector as defined in claim 1, wherein said pocket is slender, elongated, and extends along said length of said upper terminal edge of said first layer of material for depending inwardly of the front fender of the vehicle.

8. The protector as defined in claim 1, wherein said long central portion of said pocket is filled with sand for weight in maintaining said protector on the front fender of the vehicle.

9. The protector as defined in claim 8, wherein said pair of short terminal portions of said pocket are empty of said sand and lie flat for not catching on the hood hinges of the vehicle.

10. The protector as defined in claim 1, wherein said strap is a strip of doubled sided mating portions of hook and loop fasteners that depends centrally from said protector, and is maintained thereat, by said stitching, that not only maintains said strap depending from said protector, but also maintains channel webbing around and maintaining together said first layer of material and said second layer of material, with said strap depending centrally from said channel webbing.

11. The protector as defined in claim 1; further comprising a pair of loops that extend alignedly outwardly from said respective terminal ends of said short portions of said pocket for hanging up said protector when rolled up and stored, with said protector being maintained rolled up by said strap.

* * * * *